(12) United States Patent
Soudan

(10) Patent No.: US 6,681,959 B2
(45) Date of Patent: Jan. 27, 2004

(54) SYSTEM FOR SHUTTING-OFF AND RELIEVING THE PRESSURE IN A LIQUID SUPPLY LINE

(75) Inventor: Freddy Delphin Soudan, Deinze (BE)

(73) Assignee: N.V. Soudan Patrimonium and Consulting, Deinze (BE)

( * ) Notice: Subject to any disclaimer, the term of this patent is extended or adjusted under 35 U.S.C. 154(b) by 0 days.

(21) Appl. No.: 10/368,656

(22) Filed: Feb. 13, 2003

(65) Prior Publication Data

US 2003/0121938 A1 Jul. 3, 2003

Related U.S. Application Data (60) Division of application No. 09/287,037, filed on Apr. 6, 1999, now abandoned, which is a continuation-in-part of application No. 08/732,400, filed as application No. PCT/BE95/00041 on Apr. 26, 1995, now abandoned.

(30) Foreign Application Priority Data

Apr. 29, 1994 (BE) .............................................. 9400442

(51) Int. Cl.$^7$ .................................................. B01F 5/04
(52) U.S. Cl. ................................ 222/145.5; 222/145.1; 222/148; 222/189.6; 222/395; 222/334
(58) Field of Search ........................... 222/145.1, 145.2, 222/145.5, 145.7, 148, 189.06, 389, 395, 396, 334, 145.6

(56) References Cited

U.S. PATENT DOCUMENTS

| | | |
|---|---|---|
| 3,773,300 A | 11/1973 | Häuser |
| 3,926,345 A | 12/1975 | Pulk et al. |
| 3,951,311 A | 4/1976 | Johansson |
| 4,108,335 A | 8/1978 | Hoff et al. |
| 4,257,992 A | 3/1981 | Schulte et al. |
| 4,279,360 A | 7/1981 | Häuser |
| 4,366,918 A | 1/1983 | Naka |
| 4,469,251 A | 9/1984 | Sperry et al. |
| 4,471,887 A | 9/1984 | Decker |
| 4,523,696 A | 6/1985 | Commette et al. |
| 4,565,511 A | 1/1986 | Ramisch |
| 4,832,499 A | 5/1989 | Fiorentini |
| 4,881,820 A | 11/1989 | Lückhoff |
| 5,171,089 A | 12/1992 | Kuo et al. |
| 5,246,143 A | 9/1993 | Cherfane |
| 5,556,007 A | 9/1996 | Breitsprecher |
| 5,562,883 A | 10/1996 | Salisbury et al. |
| 5,605,252 A | 2/1997 | Owen et al. |

FOREIGN PATENT DOCUMENTS

| | | |
|---|---|---|
| EP | 0 347 269 | 12/1989 |
| EP | 0 378 243 | 7/1990 |

*Primary Examiner*—Kenneth Bomberg
(74) *Attorney, Agent, or Firm*—Fish & Neave; Garry J. Tuma (57) ABSTRACT

Shutting off a liquid supply line (2, 3) intended to convey foam precursors into a polyurethane foam mixing and dispensing gun, gives a better result when a system for shutting off and relieving the pressure is inserted in said supply line. This system enables to annul the pressure at the closed mouth of the gun by relieving the pressure in the supply line (2, 3).

7 Claims, 6 Drawing Sheets

SYSTEM FOR SHUTTING-OFF AND RELIEVING THE PRESSURE IN A LIQUID SUPPLY LINE

CROSS REFERENCE TO RELATED APPLICATIONS

This application is a division of, commonly assigned U.S. patent application Ser. No. 09/287,037, filed Apr. 6, 1999, now abandoned, which is a continuation-in-part of U.S. patent application Ser. No. 08/732,400, filed Oct. 29, 1996, now abandoned, which claims the benefit of PCT Application No. PCT/BE95/00041, filed Apr. 26, 1995, which claims the benefit of Belgian Patent Application No. 9400442, filed Apr. 29, 1994, all of which are incorporated by reference herein in their entireties.

BACKGROUND OF THE INVENTION

1. Field of the Invention

The present invention relates to a shut-off and pressure-relief device for controlling a supply of foam precursors into a foam mixing and dispensing means, and for annulling the pressure at the closed mouth of the dispensing means relieving the pressure in the supply line.

2. Description of the Prior Art

A polyurethane foam mixing and dispensing gun comprising a mixing chamber, a retractable or non-retractable shut-off rod, which can shut off the mixing chamber over the entire length, an actuating mechanism for moving the shut-off rod in both directions, and a grip, is widely known.

The mixing chamber consists of a cylindrical cavity into which a shut-off rod fits accurately, which rod may be moved alternately in opposite directions by means of an actuating mechanism which consists, for example, of a pneumatic, hydraulic or electrical cylinder actuator.

The foam precursors are conveyed separately towards the mixing chamber via supply lines, which are generally under a pressure of at least 6 to 12 bar.

In the most widely known systems, a certain pressure remains along the entire length of the supply line through which the foam precursors are conveyed. In order to be able to isolate the mixing chamber during shut-downs or interruptions, hand-actuated leakproof shut-off gate valves are provided on each side of the metering apparatus. These gate valves are intended to prevent the infiltration of foam precursors into the mixing chamber of the gun, when the latter is not in use.

The foam precursors are packed into steel cylinders under a nitrogen pressure of 6 to 12 $kg/cm^2$ and are delivered by a system under a pressure which may reach 30 bar. The shut-off gate valves allow the lines or drums to be isolated, but these still remain without pressure, even after any interruption in the operation of the metering apparatus.

The foam precursor supply pipe portions, which are shut off at each end, by the aforementioned valve and the shut-off rod still remain under pressure preload, even after prolonged shut-downs. For this reason, minuscule quantities of the two components may react rapidly and form extremely fine sticky foam particles, which even when there are only traces of them, may block the shut-off rod in the mixing chamber.

In the event of the shut-off rod jamming, or of the metering gun becoming obstructed, the mixing chamber and shut-off rod have to be dismantled for cleaning or replacement.

SUMMARY OF THE INVENTION

In order to avoid the leakage of liquids, particularly of liquid foam-precursors, into a shut-off line, and overcome the drawbacks of inopportune obstructions, the invention proposes a device for shutting-off and releasing the pressure in a supply line, said device comprising a first and a second supply unit, each having a first input for inputting each time one of said precursors, and a first output connected to a respective supply line made of flexible material, said supply units each having a second input for supplying a driving power, said supply units further comprise a piston type pressure pump, having an expansion and a pressure chamber and a piston provided to be driven in a first direction into said chambers by means of said supplied driving power, said supply units also comprise a tube in connection with their first input and a one-way valve which outputs into a passage towards said first output and said pressure chamber, said one-way valve being provided for supplying said foam precursor to said pressure chamber, said piston being further provided to be driven in a second direction, opposite to said first, when said foam precursor is supplied to said pressure chamber, said expansion chamber having a third input for supplying a solvent, provided for rinsing said expansion chamber and said piston, said one-way valve being provided to remain closed during substantially a whole movement of said piston along said first direction and to remain open during substantially a whole movement of said piston along said second direction.

The supply of a solvent, via the third input, enables to undo the expansion chamber and the piston from particles of the substance which would remain stuck to them. In such a manner obstructions are avoided.

According to a first preferred embodiment, wherein said second and third input form a single input, and wherein said solvent also forms an hydraulic fluid for providing said driving power, said single input being connected to an hydraulic unit for storing said solvent. In this embodiment the driving power and the cleaning action are performed by the same fluid.

According to a second embodiment, said one-way valve comprises a rod, extending in said passage, said rod being provided to be actuated by said piston, in order to open said one-way valve, when said piston reaches a lower inversion point. The rod enables an easy and reliable command of the valve.

BRIEF DESCRIPTION OF THE DRAWINGS

In the drawings a same reference sign has been assigned to a same or analogous element.

DETAILED DESCRIPTION OF THE INVENTION

Figure 1:
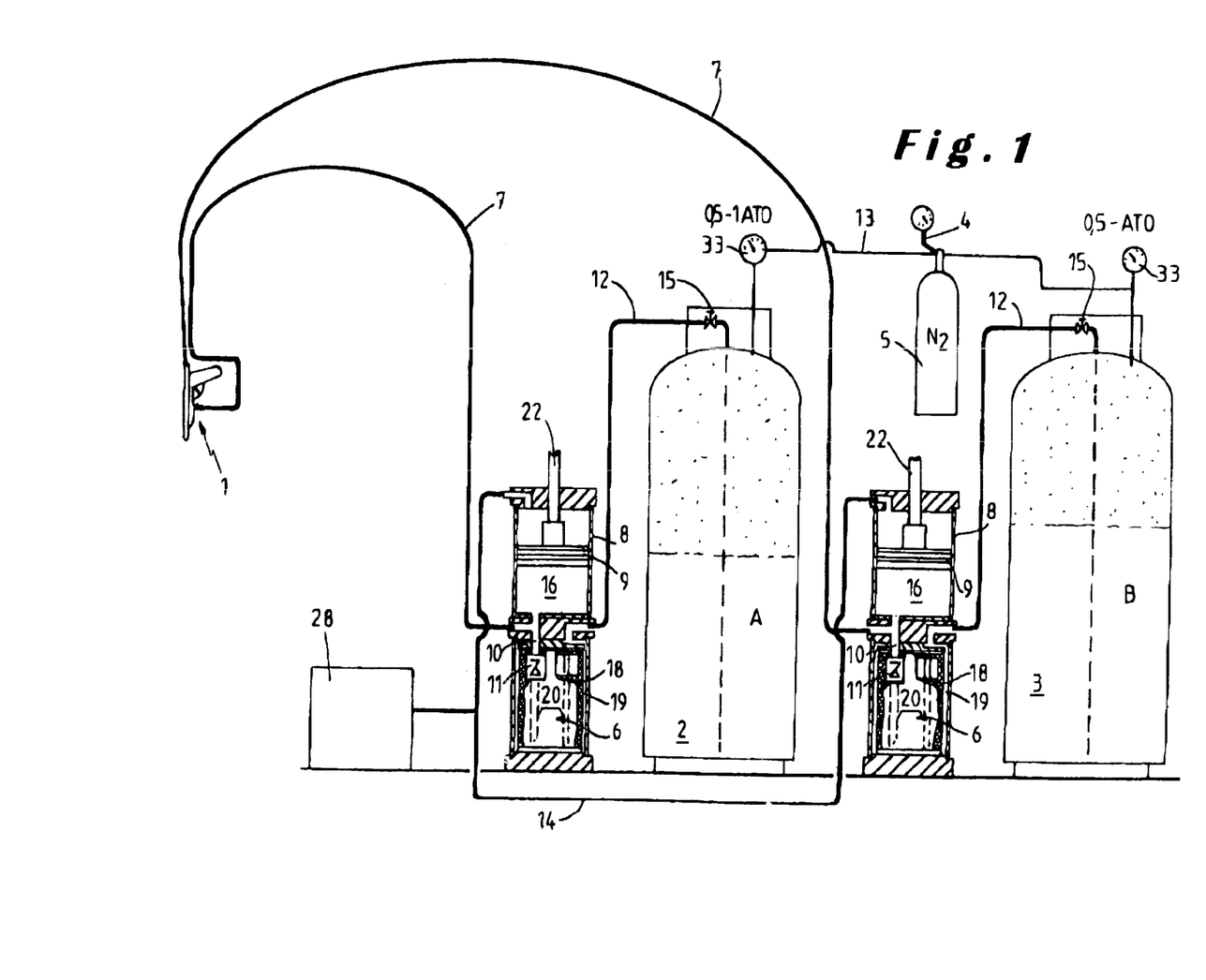
FIG. 1 is an overall view of a first embodiment of the supply device provided with two shut-off and pressure-relief units according to the invention, for the two foam precursors A and B.

As illustrated in FIG. 1, the mixing and dispensing means, preferably formed by a gun, are supplied with foam precursors stored in two storage drums, which consist of replaceable cylinders 2 and 3. The two cylinders 2 and 3 are under a nitrogen pressure of ½ to 1 bar adjusted by a pressure-reducing gange 4 connected to a cylinder 5. The base substances A and B formed by foam precursors are conveyed under pressure to the mixing gun 1 by a supply line 7A, 7B made of flexible material.

The flow rate at which the two substances A and B are metered in an equal ratio, is adjusted separately in each supply line 7A, 7B with the aid of a shut-off and pressure-relief supply unit 6, according to the invention. The units are mounted between their respective supply line 7A, 7B and the drums 2 and 3. The units are provided for relieving the pressure in the supply line 7 when they are shut off at both ends, namely at the outlet of the cylinders 2, 3 and at the inlet of the mixing gun 1.

Figure 2:
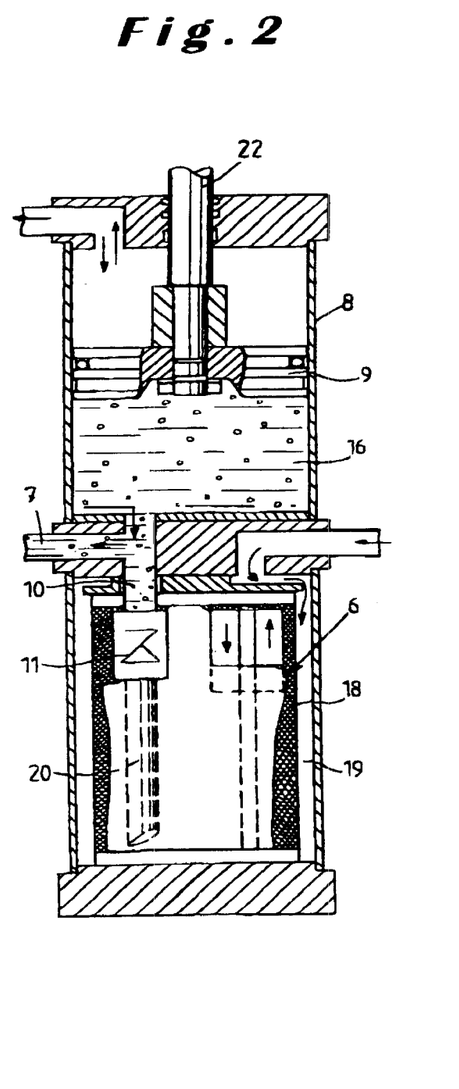
FIG. 2 is a longitudinal section through the shut-off and pressure-relief of FIG. 1 wherein the piston is half way its travel path.

The shut-off and pressure-relief unit 6 comprises a lift pump, having a cylindrical expansion chamber 8, acting as a pump body, and a piston 9, acting as the constructional element lifted by pressure. The unit further comprises a pressure chamber 16 in which the piston can move.

The supply line portions, acting as inlet and outlet of the pressure chamber 16, emerge in the bottom thereof. A first output of said unit forms the connection between the units and the supply line 7.

The pressurized storage drums 2, 3, are connected to a delivery line 12, for each substance A or B, and a nitrogen supply line 13, connecting the drums via the pressure-reducing device 4 to the nitrogen cylinder 5. A valve 15, provided to control the flow of substances in delivery line 12, is mounted in the latter. The delivery line 12 connects an output of the cylinders to a respective first input of the units 6. A metering member 33 is mounted into supply line 13, in order to monitor the pressure of the nitrogen in this line. When the mixing gun 1 is put into service, nitrogen is conveyed into each storage drum, and the pressure is adjusted to 6 bar by means of gange 4. The nitrogen will exert a pressure on the surface of the substances, and will deliver them into the respective units 6. The supply orifice of the pressure chamber 16 is provided with an intake valve 11, which is a one-way valve, enabling the substance to flow from an ascending tube 20 towards chamber 8. The ascending tube 20 being connected to the delivery line 12. The one-way valve 11 shuts the supply orifice of the pressure chamber 8 off, as long as the pressure pump is not empty, and as long as the piston 9 has not reached its lower inversion point.

The pressure as present in the steel cylinders 2 and 3 cannot act beyond the one-way valve.

The substances, supplied via the further supply lines 12, reach a cylindrical filter 18, via an annular slit 19, situated at an inner peripheral of the units 6. The substances travel from the filter 18 towards the ascending tubes 20, mounted inside the filter 18, in order to reach the one-way valve 11.

Preferably, an electrical resistance is mounted into the supply lines 7A and 7B. Those resistances are connected to a supply voltage, not shown in the drawings. The resistances enable to heat up the supply lines and to maintain them at a predetermined temperature.

A hydraulic unit 28 is connected via a duct 14 to the second input of unit 6. The hydraulic unit 28 comprises a container, filled with an hydraulic and solvent fluid. In particular Mesamoll® (Registered trademark of Bayer) is used as the latter fluid. Mesamoll® is an alkyl sulphonic ester of phenol, which besides its cleaning properties, also acts as a lubricant and a hydraulic fluid. Due to the cleaning properties of this fluid, the substance supplied from the drums 2 and 3 to the units 6, can be dissolved. In such a manner that when substances A and B would remain on the chamber 8 or 16, the fluid supplied by duct 14, would dissolve those substances.

Figure 3:
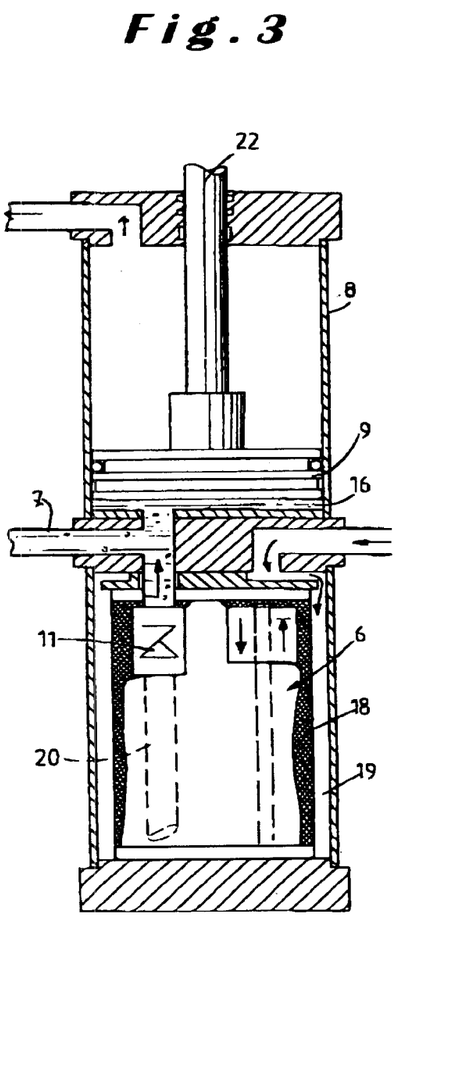
FIG. 3 is a longitudinal section similar to that of FIG. 2, of the shut-off and pressure-relief unit at the time that the delivering of the liquid foam-precursor towards the mixing chamber of the dispensing means is finished and the filling of the pressure chamber starts.

The fluid supplied by unit 28 to the second input, is input into chamber 8, and acts as a driving power on the piston 9, mounted therein. The hydraulic unit 28 supplies the fluid via duct 14 to the chamber 8 at a pressure varying between 25 and 60 bar when the trigger of the mixing gun 1 is pressed. The pressure applied by the fluid on the piston 9, will cause the latter to go down and remove the contents of chamber 16 (moving in a first direction) into the supply lines 7. As illustrated in FIG. 3, the one-way valve 11 does not allow substances to pass to the tube 20, so that the only possible outlet for them is the line 7. As soon as the mixing gun opens, the two components A and B will mix at a pressure equal to the respective pressure in the chambers 8.

When the chamber 16 is empty, the hydraulic pressure, exerted by the fluid on the piston 9, is immediately interrupted and the substance is no longer supplied to the gun 1. The working pressure in the flexible supply lines 7 falls immediately down due to the lack of pressure applied by the piston 9. Owing to the mechanical narrowing of the flexible lines 7, the residual pressure, exerted in the mixing chamber of the gun, the supply line made of flexible material and the chambers 8 and 16 are no longer able to keep the valve 11 closed. As a pressure is applied in the drums 2 and 3, the substance will now be able to reach chamber 16 via valve 11 which is now open.

The interruption of the pressure applied on piston 9 and narrowing of the supply lines 7, will cause a suction effect on the gun in such a manner that substances which would remain at the output orifices of the gun are sucked back inside the supply lines. Blocking of the orifices can thus be prevented.

The chamber 16 will be filled with the substance, causing the piston to move upwards (second direction) and this will take place at the pressure applied in the cylinders (½ to 1 bar). The upward movement of piston 9 will cause the fluid to flow back to the hydraulic unit 28, as shown in FIG. 3. As this fluid was present in chamber 8, the walls of the latter will be cleaned from remaining substances by the solvent properties of the fluid. Once the chamber 16 is again filled with the substance, the fluid is again supplied to chamber 8, and the process is started again for supplying the substances to the gun. The suction effect created by the upward movement of the piston will also be felt by the orifices of the gun, thus further causing the latter to be cleaned.

When during injection of long duration, which might exceed the contents of the pressure chamber 16, the moving piston 9 almost reaches the bottom of said chamber there is a risk of a shortage of substances or of a partial vacuum, an end-of-stroke switch (not shown), which is mounted on the guide rod 22 of piston 9, will close the gun and annul the fluid pressure just before this situation arises. A second end-of-stroke switch will detect the maximum level.

In a more elaborated version, the end-of-stroke switches are replaced by a linear distance measurement, which transmits this information to a microprocessor, which manages each stage in turn.

A main feature of the present invention consists in the fact that the flexible supply line 7 becomes pressurized only when injection is being carried out and during the few seconds thereafter. Afterwards, the pressure drops down until it is equal to that in the supply line (½ to 1 bar). Given that the same pressure is present at the closed mixing chamber of the gun, the working pressure, which is normally constant, is reduced to a pressure of ½ to 1 bar. The low pressures constitute no risk of any blocking of the mixing chamber by the substances.

As already mentioned, the fluid which transmits the pressure is a solvent, which apart from its hydraulic liquid properties, has with regard to the two substances, properties of solvent and of lubricant action. The walls of the chamber 8, in which the piston 9 moves, therefore come into contact with the fluid, each time there is a movement. Any possible microscopic particles of the substances, which might stick to the wall, are dissolved, and lubrication of the piston 9 is ensured.

It is likewise important for the pressure below the moving piston 9 to be identical to the one above the piston, so that infiltration of sticky particles, which would be due to the difference in pressure in the two chambers, is hardly possible.

Figure 6:
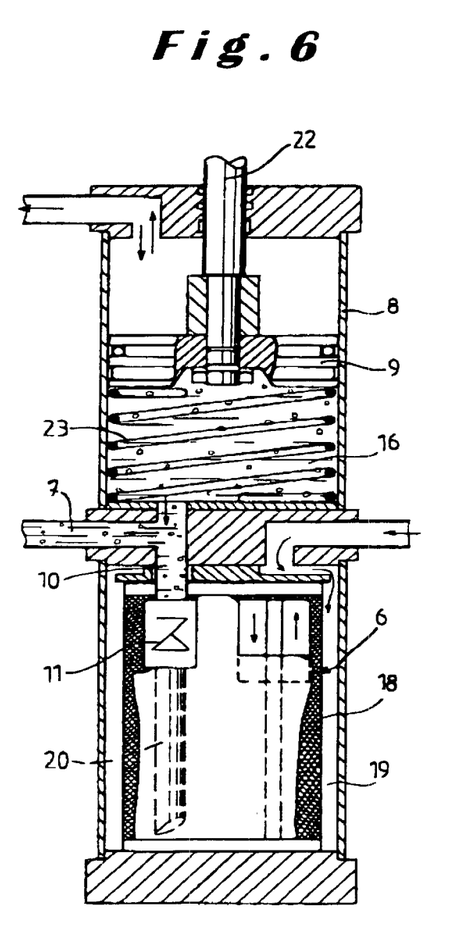
FIGS. 6 and 7 are each a longitudinal section through a third embodiment of a shut-off and pressure relief unit according to the invention.
Figure 7:
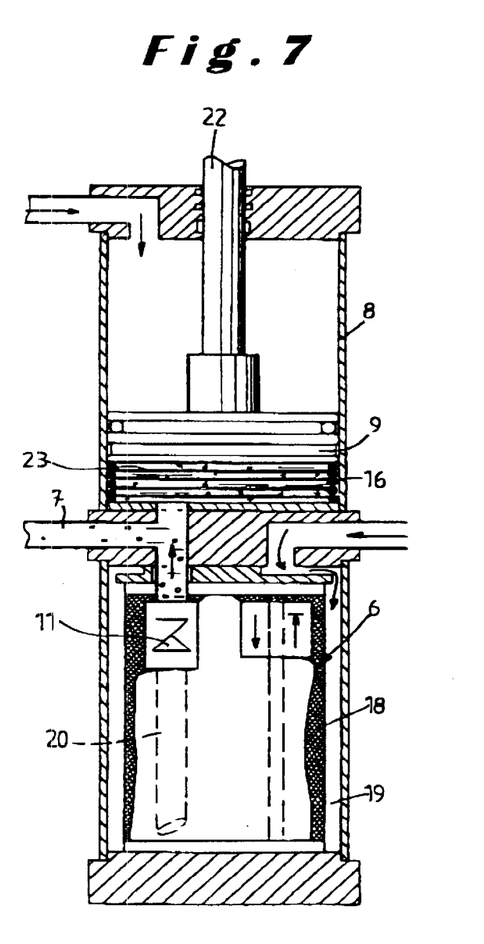

The FIGS. 6 and 7 show another embodiment of the device according to the invention. This device distinguishes from the one illustrated in the FIGS. 1 to 3, in that a spring 23 is applied in chamber 16. In a rest position, the spring 23 exerts a force on piston 9, causing the latter to be in an upward position. The supply of fluid to chamber 8 causes not only a downward movement of the piston, but also a compression of the spring 23 as illustrated in FIG. 7. Once chamber 16 is empty and the supply of fluid is stopped, the return force exerted by the spring on the piston, will push the latter upwards. This will on its turn cause a suction on valve 11, which will open, in order to supply substances to the chamber 16. As the gun 1 is closed and due to the suction effect, the substance will mainly flow towards chamber 16.

Figure 4:
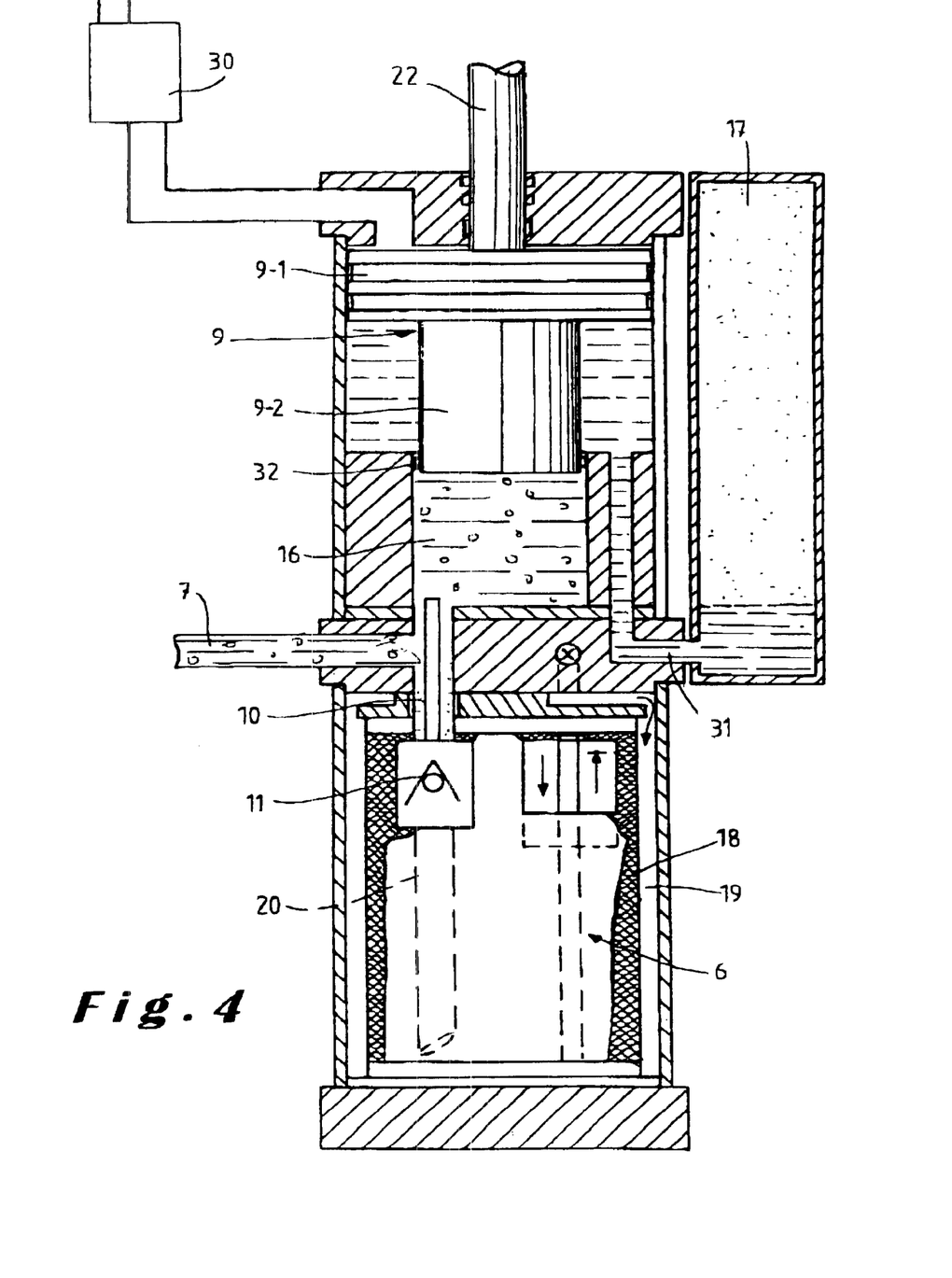
FIGS. 4 and 5 are each a longitudinal section through a second embodiment of a shut-off and pressure relief unit according to the invention.
Figure 5:
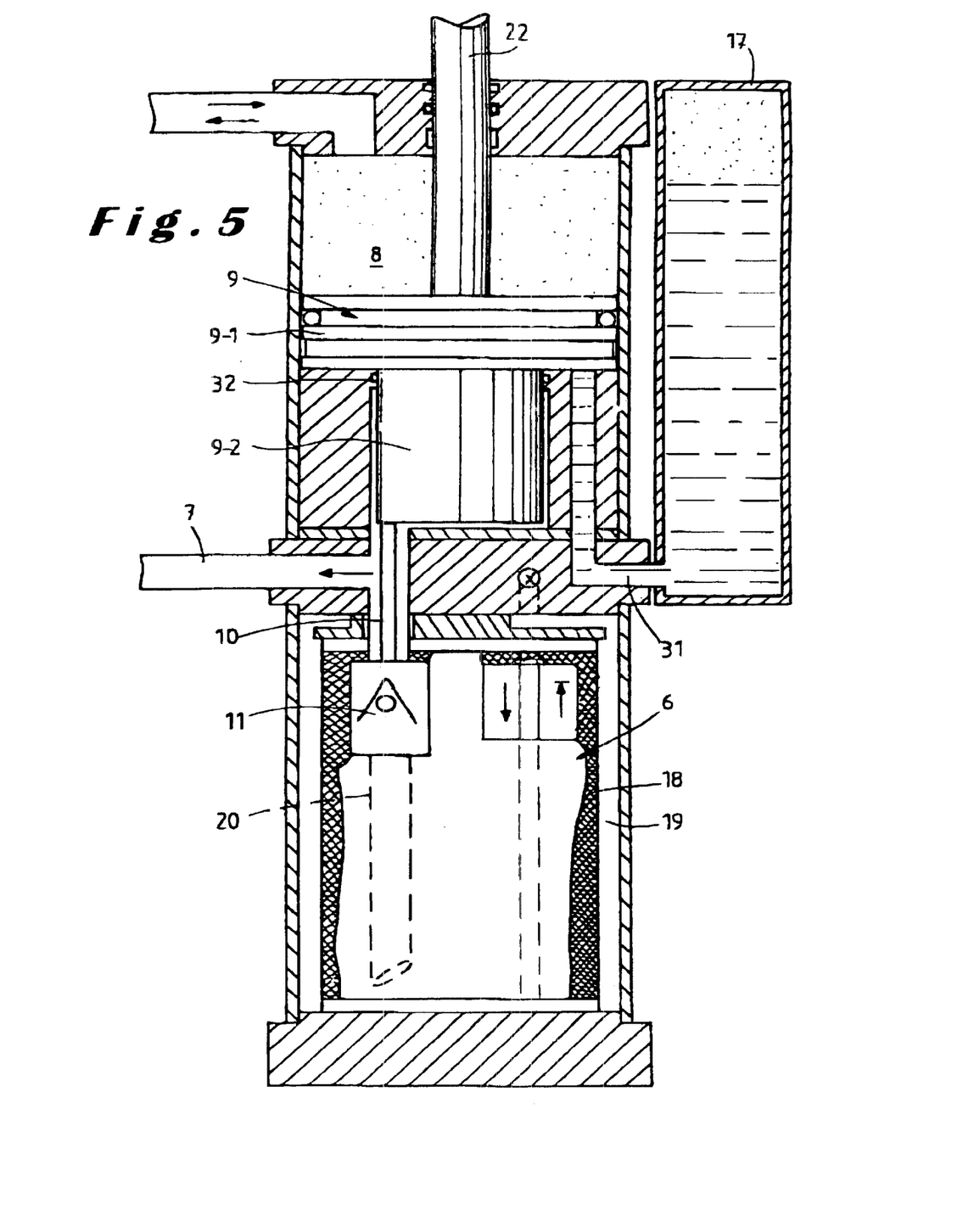

The FIGS. 4 and 5 illustrate a further embodiment of a device according to the invention. This embodiment distinguishes from the one illustrated in FIGS. 1 to 3 by the construction and the operation of the shut-off and pressure-relief system 6. The movement of piston 9 is controlled by compressed air, supplied by a source 30. This source supplies compressed air, preferably at 6 atm, into the chamber 8.

The piston 9 comprises a piston head 9-1 and a body part 9-2. The body part penetrates into chamber 16 during the downward movement of the piston. An O-ring 32 is applied on the upper border of chamber 16 and prevents liquid to flow from chamber 8 to chamber 16.

A reservoir 17 of fluid, in particular Mesamoll®, is placed next to the chambers 8 and 16 and connected via a duct 31 to chamber 8. In this embodiment the fluid is no longer used as a hydraulic liquid, but only as a cleaning fluid.

The valve 11 is also a one-way valve, which is controlled by a rod 10, extending in the passage from the ascending tube 20 to chamber 16. The rod has such a length that it also extends somewhat in chamber 16, so that, when the piston 9 reaches the lower end of its travelling path, it acts on the rod 10, in order to open valve 11.

During operation, compressed air is supplied by the source 30 to chamber 8, causing a pressure on piston 9. The latter will on its turn cause the piston to move downwards and to push the fluid from chamber 8 via duct 31 to the reservoir 17. The fluid can not penetrate into chamber 16 due to the presence of the O-ring 32.

The downward movement of piston 9 will pressurize the substance, present in the chamber 16, so that it is under a higher pressure than the one in the cylinders 2, 3. This enables that a pressure is applied, which is instantaneously higher in the start-up phase for a few seconds. This helps in quickly pressurizing the units 6, and reducing the known low flow rates, especially of the substance B, during the first few seconds. The downward movement of piston 9, causes the substance, present in chamber 16, to be pushed via supply lines 7 to the gun 1. As valve 11 is closed, the substance can only travel through supply line 7. Once the lower part of the piston has reached the very end of its travel path, it pushes the rod 10 downwards. When the valve 11 is opened by the pressure, applied by rod 10, the substance flows immediately under pressure along the ascending tube 20, via valve 11, to chamber 16.

The compressed air is then no longer applied to the piston 9. The substance supplied via valve 11 now causes an upward pressure on piston 9, causing the latter to travel back to its upward position. In such a manner, chamber 16 is again filled by the substance. The upward movement of piston 9 causes the fluid, present in the reservoir 17, to be sucked into chamber 8. The supply of fluid will now cause the piston body 9-2 to be cleaned from substance particles.

Since the piston has now moved upwards, the rod no longer pushes down, and the valve 11 closes. The residual working pressure in the flexible line 7, will be sent, owing to the mechanical narrowing of the flexible line, towards the expansion chamber 16, which will balance out at an equal pressure level. Since the fluid on the available surface area of the piston, just like the substance on the surface area of the piston, interact in the same direction and the same sense, care must be taken to ensure that the pressure, which is still present at this stage, is in balance in the cylinder 17.

At a higher pressure in the cylinder, the fluid will also continue to push the piston 9 back upwards, the consequence of this being the possible setting-up of a partial vacuum in the flexible line 7.

When the storage drum 2 or 3 becomes empty, a level switch shuts off the nitrogen gate valve 15. The empty drum is ecological because it can be refilled again without having to be cleaned out.

Figure 8:
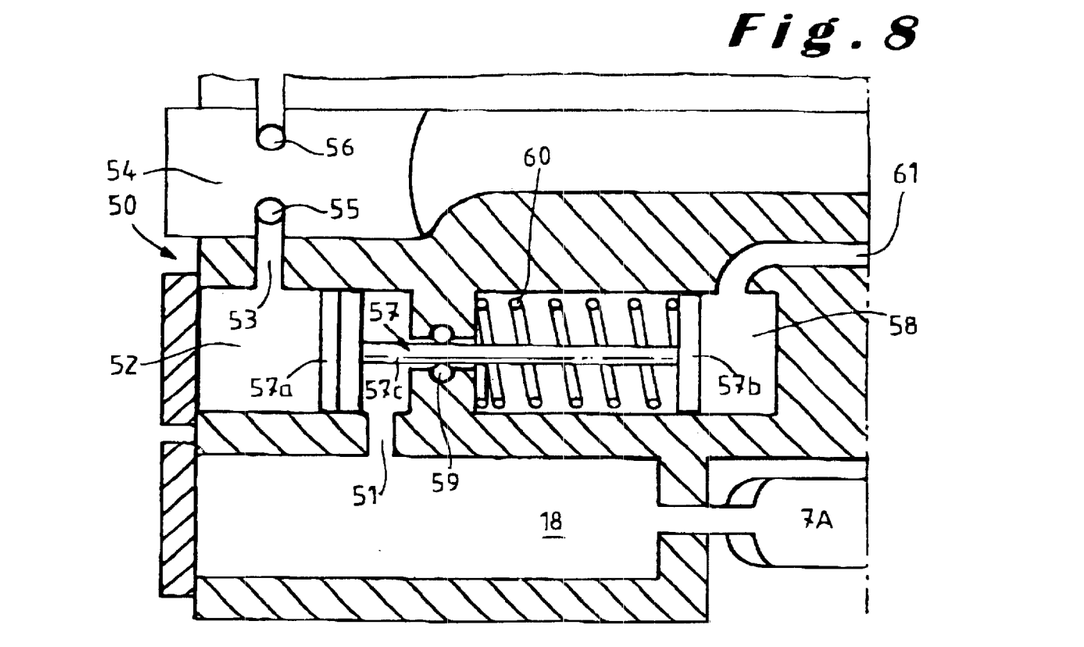
FIGS. 8 and 9 show a shut-off and pressure relief unit according to the invention mounted in the supplying means.
Figure 9:
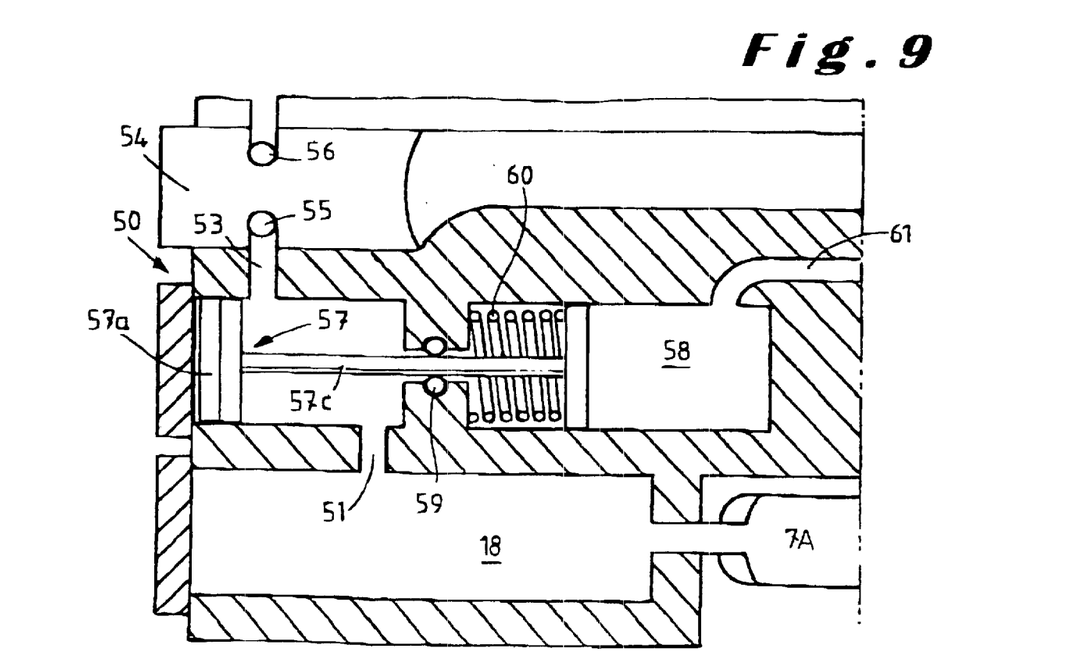

According to a further embodiment illustrated in FIGS. 8 and 9, the shut-off pressure-relief unit is mounted in the gun 1. In these figures only a single unit is shown as the other unit has the same configuration and operates according to the same principle. The unit 50 is connected to the supply lines 7, and comprises the filter 18, mounted in a cavity. The cavity is connected via a first duct 51 to the pressure chamber 52 in which a first end 57a of a piston 57, can move. The chamber 52 is connected via a second duct 53 to a first aperture 55, giving access to a mixing chamber 54. The mixing chamber also comprises a second access 56, which is connected to the second unit, not shown in these figures.

An O-ring 59, situated between the pressure chamber 52 and the expansion chamber 58, is wrapped around the piston rod 57c connecting the first end 57a with the second end 57b of the piston 57. A helical spring 60 is placed in said expansion chamber 58 around piston rod 57c. A supply duct 61 supplies hydraulic fluid, in particular Mesamoll®, to the expansion chamber 58.

During operation, the hydraulic fluid is supplied under a pressure of for example 25 to 60 bar, via the supply duct 61 to the expansion chamber 58. The pressure applied by the incoming fluid on the second end 57b of the piston 57, causes the latter to be moved in a first direction, i.e. towards the left side in the drawings. The movement of the piston causes the spring 60 to be compressed. During the same movement the first end 57a of the piston also moves towards the left in the pressure chamber 52.

Once the piston has reached the end of its travel path, as illustrated in FIG. 9, the spring is completely compressed and the piston has reached its inversion point. This is detected, for example by means of a mechanical detector (not shown), which produces a stop signal in order to stop the supply of hydraulic fluid. This causes the pressure, applied on the piston, to be stopped, so that the spring can relax and push the piston back.

Since the first end 57a of the piston is now at the front end of the pressure chamber 52, the substance applied via supply line 7 can flow via the filter 18, the first duct 51 through chamber 52, and the second duct 53 to the mixing chamber 54. Indeed, the position of the piston enables a throughput of the substance through chamber 52.

Due to the relaxing of the spring, the piston is moved in a second direction towards the left. This will cause the passage from the first duct 51 through chamber 52 to be closed, once the first end of the piston has passed the second duct 53. The hydraulic fluid present in chamber 58 will also be pushed back into the supply duct 61. Due to its backward movement, the piston creates a suction effect in the pressure chamber, causing the substance present in the second duct 53 and the aperture 55 to be sucked back into chamber 52. In such a manner there is prevented that substances remain within the aperture 55, causing the latter to be obstructed.

Once the spring 60 is relaxed, the piston has reached its original position, which is detected by another detector, also not shown. This detection enables to start again the supply of the hydraulic fluid so that the process can start again.

What is claimed is:

1. A shut-off and pressure-relief device for controlling a supply of foam precursors into a foam mixing and dispensing means, said device comprising a first and a second supply unit, each having a first input for inputting one of said precursors into said supply unit, and a first output connected to a mixing chamber, each supply unit further comprises a piston type pressure pump, having an expansion and a pressure chamber, and a piston arranged to be moved within said pressure and expansion chambers, said pressure chamber being connected to said first input by means of a first duct and to said mixing chamber by means of a second duct, a first head of said piston being provided to be driven into said pressure chamber by means of a driving power supplied on said piston within said expansion chamber so that when said driving power is supplied, said first head is moved within said pressure chamber so as to enable the latter to be filled with one of said foam precursors through said first duct until said first head reaches a position in which said first head opens a passage for said foam precursor from said pressure chamber to said mixing chamber through said second duct.

2. A shut-off and pressure-relief device as claimed in claim 1, wherein each supply unit comprises a spring applied around said piston for returning said first head after it has reached said position in which said first head opens said passage for said foam precursor from said pressure chamber to said mixing chamber and after said driving power stops to be applied.

3. A shut-off and pressure-relief device as claimed in claim 1 or 2, wherein said supply units are mounted into said dispensing means.

4. A shut-off and pressure-relief device as claimed in claim 1 or 2, wherein said supplied driving power is provided by an hydraulic fluid and each supply unit comprises a third duct ending in said expansion chamber for supplying said hydraulic fluid into said expansion chamber.

5. A shut-off and pressure-relief device as claimed in claim 1 or 2, wherein said pressure and expansion chambers are separated by means of an O ring wrapped around a rod of said piston.

6. A shut-off and pressure-relief device as claimed in claim 2, wherein said spring is arranged within said expansion chamber.

7. A shut-off and pressure-relief device as claimed in claim 6, wherein said piston has a second head opposite to said first head and arranged within said expansion chamber and wherein said spring and said third duct are arranged on opposite sides of said second head.

* * * * *